United States Patent
Lee et al.

(10) Patent No.: US 12,071,348 B2
(45) Date of Patent: Aug. 27, 2024

(54) GRAPHENE NANOPORE MANUFACTURING METHOD USING DETACHABLE FUNCTIONAL GROUPS AND GRAPHENE SHEET HAVING GRAPHENE NANOHOLES FORMED THEREBY

(71) Applicants: SGRAPHENE, Seoul (KR); SEOUL NATIONAL UNIVERSITY R&DB FOUNDATION, Seoul (KR)

(72) Inventors: Gwan-Hyoung Lee, Seoul (KR); Eunji Ji, Seoul (KR)

(73) Assignees: SGRAPHENE, Seoul (KR); SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 422 days.

(21) Appl. No.: 17/333,724

(22) Filed: May 28, 2021

(65) Prior Publication Data

US 2022/0371897 A1 Nov. 24, 2022

(30) Foreign Application Priority Data

May 24, 2021 (KR) .......................... 10-2021-0065950

(51) Int. Cl.
C01B 32/194 (2017.01)
(52) U.S. Cl.
CPC ........ C01B 32/194 (2017.08); *C01P 2004/04* (2013.01)

(58) Field of Classification Search
CPC .......................... C01B 32/194; C01P 2004/04
See application file for complete search history.

(56) References Cited

U.S. PATENT DOCUMENTS

2015/0258588 A1* 9/2015 Moon .................. B08B 17/065
428/156

FOREIGN PATENT DOCUMENTS

| CN | 111747401 | * 10/2020 |
| KR | 10-2017-0025098 A | 3/2017 |
| WO | WO 2018-105559 | * 6/2018 |

OTHER PUBLICATIONS

English translation of WO Publication 2018-105559, Jun. 2018.*
English translation of CN Publication 111747401, Oct. 2020.*

* cited by examiner

*Primary Examiner* — Brittany L Raymond
(74) *Attorney, Agent, or Firm* — Hauptman Ham, LLP

(57) ABSTRACT

Provided is a method for forming graphene nanoholes to form nanoholes in a graphene sheet, the method comprising a process (a) of forming a functional group-bonded region in a graphene sheet, and a process (b) of heating the graphene sheet having the functional group-bonded region to remove the functional group-bonded region to form nanoholes.

7 Claims, 4 Drawing Sheets

---

PREPARING GRAPHENE SHEET

↓

FORMING FUNCTIONAL GROUP-BONDED REGION IN GRAPHENE SHEET

↓

REMOVING FUNCTIONAL GROUP-BONDED REGION TO FORM NANOHOLES (a)

(b)

(c)

(d)

GRAPHENE NANOPORE MANUFACTURING METHOD USING DETACHABLE FUNCTIONAL GROUPS AND GRAPHENE SHEET HAVING GRAPHENE NANOHOLES FORMED THEREBY

CROSS-REFERENCE TO RELATED APPLICATION

This application claims priority to Korean Patent Application No. 10-2021-0065950 filed on May 24, 2021 and all the benefits accruing therefrom under 35 U.S.C. § 119, the contents of which are incorporated by reference in their entirety.

BACKGROUND

The present disclosure relates to a method for forming graphene nanoholes using detachable functional groups, and more particularly, to a graphene sheet having the graphene nanoholes formed thereby.

Graphene, made of carbon atoms that are bonded together, is a material having a 2-D plane structure, and has one to several layers.

Due to the fact that such graphene, unlike graphite, has high strength, excellent electron mobility, excellent thermal conductivity, and high light transmittance to visible light, research on graphene is under way in various fields.

For example, efforts have been actively made to use graphene for separators and negative electrode materials, which are core materials for electric vehicle batteries, or for electrolyte membranes of fuel cells, filters, and next-generation semiconductors by virtue of excellent atomic impermeability of graphene and selective atomic permeability of stacked graphene films.

In a way to improve characteristics of separators or filter products using graphene, nanoholes are formed in graphene.

According to the related art, a method for forming holes through heat treatment after depositing metal atoms or organic molecules on a graphene sheet, or a method for forming holes in a graphene sheet using plasma or laser has been used.

However, the forming of holes through heat treatment after depositing metal atoms or organic molecules in a graphene sheet is performed using a chemical reaction between the deposited materials and graphene, making it hard to form nano-sized holes (nanoholes), and further making it unachievable to form large-area graphene.

In addition, the forming of holes using plasma or laser makes it hard to keep the size of nanoholes uniform, and allow only a small number of holes to be formed at a local portion.

After all, the methods of forming holes in graphene sheets according to the related art have limitations to be applicable in the industry.

Therefore, there remains a need for a new method for forming nanoholes in graphene sheets.

RELATED ART DOCUMENT

Patent Document

SUMMARY

The present disclosure provides a method for forming graphene nanoholes in a graphene sheet, which may be performed in a dry manner, and is capable of controlling the size and shape of the nanoholes, and graphene having the nanoholes formed thereby.

Meanwhile, other aspects of the present disclosure unspecified in the specification will be additionally considered within a range that may be easily inferred from the detailed explanations described below and effects thereof.

In accordance with an embodiment of the present disclosure, a method for forming graphene holes includes a process (a) of forming a functional group-bonded region in a graphene sheet, and a process (b) of heating the graphene sheet having the functional group-bonded region to remove the functional group-bonded region to form nanoholes.

In an embodiment, the process (a) may be performed by making an activation gas containing fluorine (F) react with a graphene sheet to form a functional group-bonded region.

In an embodiment, the activation gas containing fluorine (F) may be any one selected from the group consisting of $XeF_2$, $CF_4$, and $SF_6$, or a combination thereof.

In an embodiment, the process (a) may be performed at about 0.2 torr to about 3 torr.

In an embodiment, the process (a) may be performed by using a semiconducting catalyst or a metallic catalyst together.

In an embodiment, the size, shape, or density of nanoholes formed at the pressure or reaction time at which the process (a) is performed may be controlled.

In an embodiment, the process (a) may be performed by forming a functional group-bonded region without damage, using hydrogen or oxygen plasma.

In an embodiment, the process (b) may be performed for about 1 hour to about 24 hours at about 50° C. to about 500° C. in an atmosphere of an inert gas or in a vacuum atmosphere.

In accordance with another embodiment of the present disclosure, a graphene sheet in which nanoholes are formed has at least some of the edges of the nanoholes with a zigzag structure or an armchair structure.

In another embodiment, functional groups may be bonded to the edges of the nanoholes.

In another embodiment, the nanoholes may be formed by a process (a) of forming a functional group-bonded region in a graphene sheet, and a process (b) of heating the graphene sheet having the functional group-bonded region to remove the functional group-bonded region to form nanoholes.

BRIEF DESCRIPTION OF THE DRAWINGS

Embodiments can be understood in more detail from the following description taken in conjunction with the accompanying drawings, in which.

DETAILED DESCRIPTION OF EMBODIMENTS

Hereinafter, a configuration of the present disclosure guided by various embodiments of the present disclosure and effects therefrom will be described with reference to the drawings. Also, in describing the present disclosure, detailed descriptions of related known functions obvious to those skilled in the art will be omitted when it is determined that the detailed descriptions may unnecessarily obscure the gist of the present disclosure.

In the present description, the term "nanohole" refers to a hole having a diameter (or length of the longest side of the hole) of 1 nm or less or a few to tens of nm.

Figure 1:
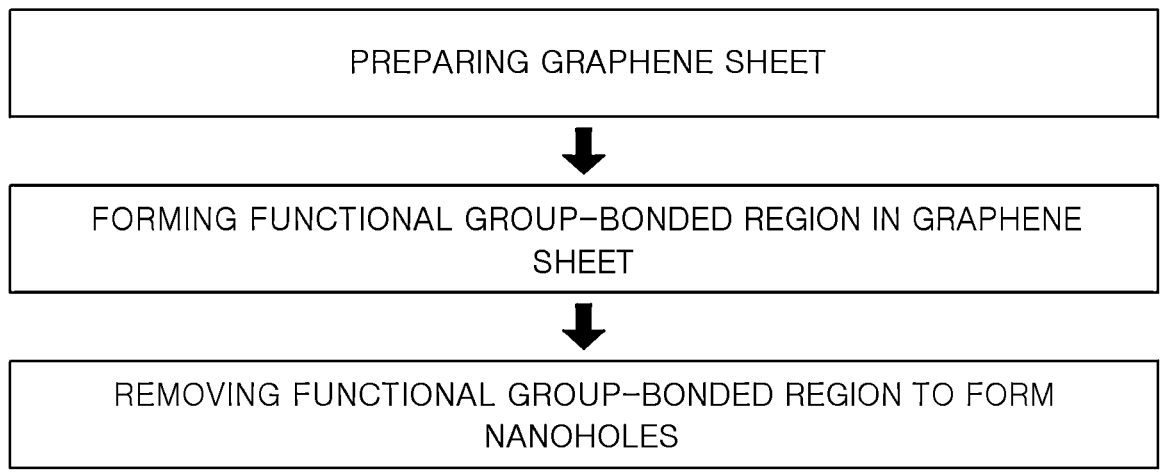
FIG. 1 is a schematic flowchart showing a method for forming graphene nanoholes in accordance with an embodiment of the present disclosure.
Figure 2:
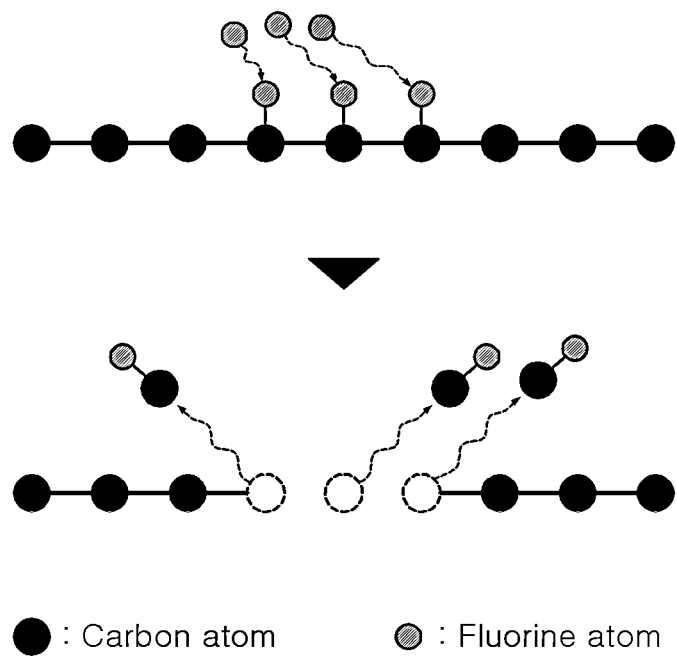
FIG. 2 is a schematic view showing a process for forming nanoholes in a graphene sheet by using the method for forming the graphene nanoholes in accordance with an embodiment of the present disclosure.

FIG. 1 is a schematic flowchart showing a method for forming graphene nanoholes according to an embodiment of the present invention, and FIG. 2 is a schematic view showing a process of forming nanoholes in a graphene sheet by using the method for forming the graphene nanoholes according to an embodiment of the present disclosure.

Referring to FIGS. 1 and 2, a method for forming graphene nanoholes according to an embodiment of the present disclosure will be described.

First, a process of preparing a graphene sheet is performed.

There is no limitation in terms of graphene sheets to which the method for forming the graphene nanoholes according to an embodiment of the present disclosure is possibly applied.

For example, regardless of the shape or production method (e.g., graphene powder, graphene produced through chemical vapor deposition, coated graphene, etc.), the method for forming the graphene nanoholes according to an embodiment of the present invention may be applied.

A process of forming a functional group-bonded region in a graphene sheet is performed.

The process of forming the functional group-bonded region include a process of using an activation gas containing fluorine (F) and a process of using hydrogen or oxygen plasma.

The process of using an activating gas containing fluorine is performed by placing a graphene sheet in a chamber and exposing the graphene sheet to the activation gas having a pressure of about 0.2 torr to about 3 torr at room temperature to form functional groups on the surface of the graphene sheet.

In this case, the graphene sheet may be exposed to the activation gas containing fluorine for about 30 seconds to about 600 seconds.

When the activation gas containing fluorine reacts with the graphene sheet, fluorine functional groups are formed on the surface of the graphene sheet.

The activation gas containing fluorine may be any one selected from the group consisting of $XeF_2$, $CF_4$, and $SF_6$, or a combination thereof.

In order to form nanoholes, functional groups need to form a certain region to be bonded to the graphene sheet, but in the process using the activation gas containing fluorine, when the activation gas has a pressure of less than about 0.2 torr, the functional groups can hardly be bonded to the surface of the graphene sheet to form a certain region.

In the process of using the activation gas containing fluorine, when the activation gas has a pressure of greater than about 0.3 torr, functional groups are not bonded to the graphene sheet at a certain region but are bonded throughout the graphene sheet, and thus when forming nanoholes through heat treatment, graphene is completely removed.

Likewise, when the graphene sheet is exposed to the activation gas containing fluorine for less than 30 seconds, functional groups are not bonded to the surface of the graphene sheet enough to form a certain region, and when the exposure takes greater than about 600 seconds, the functional groups are not bonded to the graphene sheet at a certain region but are bonded throughout the graphene sheet.

In the process of using the activation gas containing fluorine, when increasing the pressure or reaction time of the activation gas, a functional group-bonded region in the graphene sheet may be increased in size.

That is, in the process of using the activation gas containing fluorine, when regulating the pressure or reaction time of the activation gas, the size of the functional group-bonded region in the graphene sheet may be controlled.

In particular, in the method for forming the graphene nanoholes of the present disclosure, the number of nanoholes, that is, the density, may be controlled by regulating the pressure or reaction time of the activation gas.

Meanwhile, in the process of using the activation gas containing fluorine, semiconductor catalysts such as Si, Ge, and Sn may be used to assist the forming of functional groups, or metallic catalysts such as Au, Ag, and Cu may be used together.

In particular, when $XeF_2$ is used as an activation gas, there is a limitation in that fluorine functional groups are not properly formed in the graphene sheet, and by using a Si wafer piece, a Ge wafer piece, Si powder, or Ge powder together as a catalyst, fluorine (F) functional groups are formed on the graphene sheet.

The process of using hydrogen or oxygen plasma is performed by generating plasma in the presence of hydrogen or oxygen gas to form hydrogen or oxygen functional groups in the graphene sheet.

In this case, a mixed gas of hydrogen and oxygen may be used.

The use of hydrogen, oxygen, or plasma in the forming of a functional group-bonded region to the graphene sheet is different from the typical manner of directly forming holes using plasma.

That is, the process of using hydrogen or oxygen plasma in the present disclosure is performed by forming a functional group-bonded region in the graphene sheet using remote plasma, which is a mild plasma technology (equipment that floats plasma at a distance and keeps samples away from the plasma to prevent direct physical impact of plasma ions and allow only chemical reactions with ionized gas to occur).

In this case, the functional groups formed in the graphene sheet through hydrogen or oxygen plasma may be any one selected from the group consisting of —H, —O—, —OH, and —OOH, or a combination thereof.

However, in the method for forming the graphene nanoholes according to an embodiment of the present disclosure, known methods may be used for the process of forming functional groups in the graphene sheet using an activation gas containing fluorine or the process of forming functional groups in the graphene sheet using hydrogen or oxygen plasma.

Functional groups formed in the process of forming the functional group-bonded region in the prepared graphene sheet may be functional groups such as —F, —H, —O—, —OH, and —OOH.

Lastly, a process of forming nanoholes by removing the functional group-bonded region is performed.

The process of forming the nanoholes by removing the functional group-bonded region is performed through heat treatment in a vacuum atmosphere or in an atmosphere of an inert gas.

Nitrogen or argon may be used as an inert gas.

The heat treatment may be performed in a furnace at about 200° C. to about 500° C. for about 1 hour to about 24 hours, or may be performed by instantaneously heating the functional group-bonded region through laser, UV treatment, etc.

When the graphene sheet having the functional group-bonded region is heated in vacuum or in the presence of an inert gas, only the functional group-bonded region is removed, and thus nanoholes are formed in the graphene sheet.

When using the method for forming graphene nanoholes according to an embodiment of the present disclosure, nanoholes may be formed in the graphene sheet having a hole diameter of 1 nm or less.

Furthermore, in the process of forming the functional group-bonded region in the graphene sheet in the process of forming graphene nanoholes according to an embodiment of the present disclosure, when regulating an activation gas, a reaction time, a pressure, a temperature, or hydrogen or oxygen plasma conditions, the size or shape of the functional group-bonded region is controlled, which may lead to controlling the size, shape, and density of nanoholes.

Figure 3:
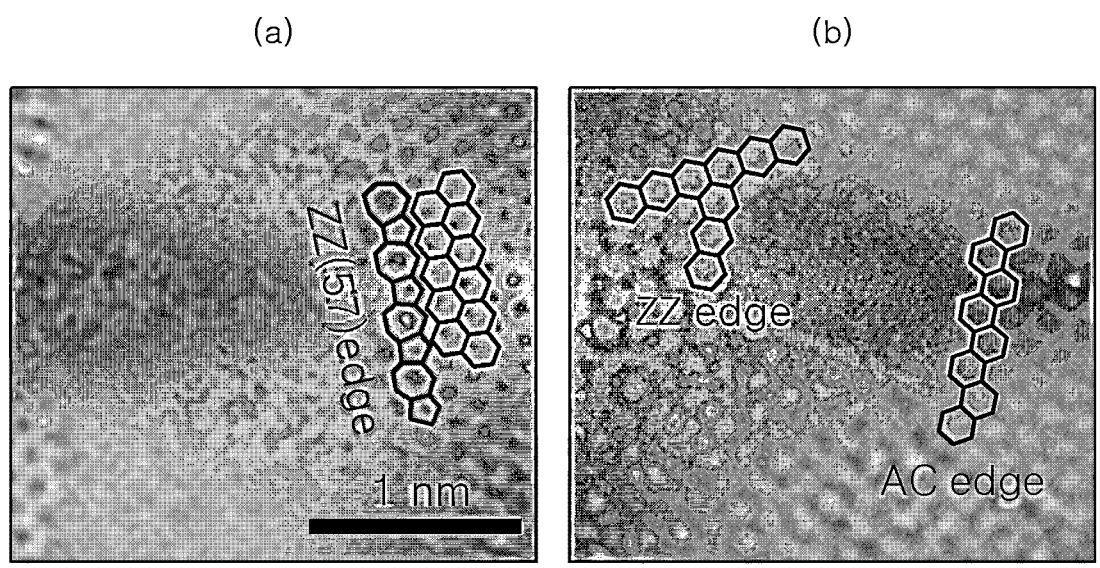
FIG. 3 is a TEM image of a graphene sheet in which nanoholes are formed in accordance with another embodiment of the present disclosure.

FIG. 3 is a TEM image of a graphene sheet in which nanoholes are formed according to another embodiment of the present disclosure.

Referring to FIG. 3, it is seen that in the graphene sheet in which nanoholes are formed according to another embodiment of the present disclosure, at least some of the edges of the nanoholes have a zigzag ZZ structure or an armchair (AC) structure, and the zigzag ZZ structure may be formed by a hexagonal carbon structure of 6 carbons, or may be formed by a structure in which 5 carbons and 7 carbon rings are alternately formed.

This is different from a structure having an irregular shape that looks like the edges of nanoholes formed through the typical methods are torn off.

The process of forming nanoholes in the graphene sheet is intended to allow only specific ions or gases to permeate and prevent other substances from permeating, but in the typical methods, there is a limitation in that when the edges of the nanoholes have a torn-off shape, the permeability of specific ions or gases is reduced.

However, in the graphene sheet in which nanoholes are formed according to another embodiment of the present disclosure, at least some of the edges of the nanoholes have a zigzag ZZ structure or an armchair (AC) structure, so that the nanoholes have a regular shape in the crystal direction, which may prevent the reduction in the permeability of specific ions or gases due to the state of the edges.

In addition, in the case of the graphene sheet in which nanoholes are formed according to another embodiment of the present disclosure, at the edges of the nanoholes, functional groups (—H, —O—, —OOH, —OH, etc.) are bonded to dangling bonds, which may lead to generating an electric field effect due to the functional groups bonded to the edges of the nanoholes, thereby accelerating the permeation of specific ions carrying an electric charge.

EXAMPLE

First, a graphene sheet to form nanoholes was prepared.

The prepared graphene sheet was placed in a chamber, and $XeF_2$ was introduced into the chamber to react with the graphene sheet, thereby forming a functional group-bonded region in the graphene sheet.

The process of forming the functional group-bonded region in the graphene sheet was performed at about 1.8 torr, about 25° C., and with a reaction time of about 60 seconds, about 180 seconds, and about 300 seconds.

In the forming the functional group-bonded region in the graphene sheet, as a catalyst, a piece of Si wafer was placed together with the graphene sheet.

The graphene sheet having the functional group-bonded region was placed in an annealing furnace and heated at about 300° C. for about 4 hours in a vacuum atmosphere ($10^{-4}$ torr) to remove the functional group-bonded region, thereby forming nanoholes.

Figure 4:
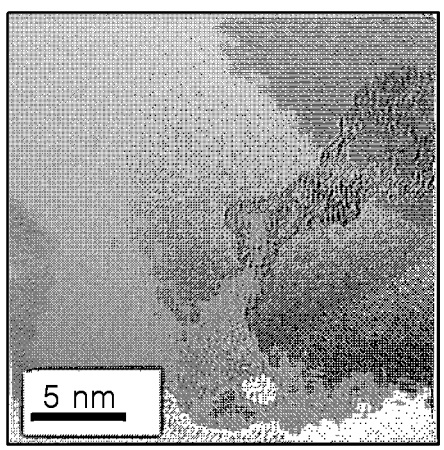
FIG. 4 is a TEM image of a graphene sheet in which nanoholes are formed by using the method for forming the graphene nanoholes in accordance with an embodiment of the present disclosure, and describes an increase in size of the nanoholes according to pressure of an activation gas and processing time.
Figure 4:
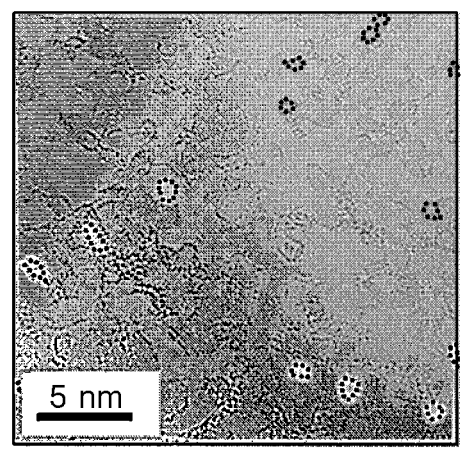
Figure 4:
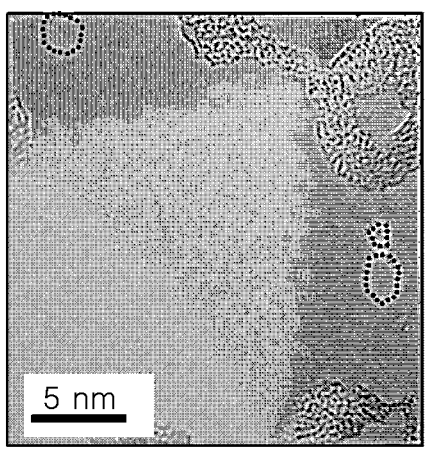
Figure 4:
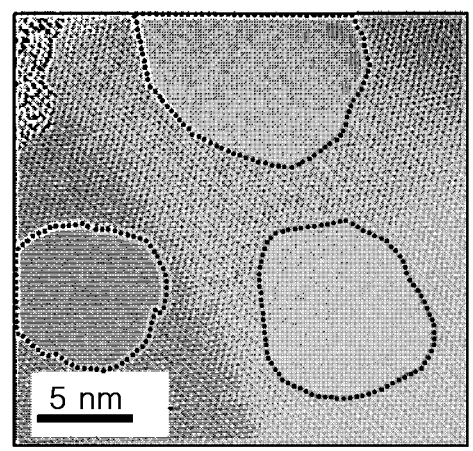

FIG. 4 is a TEM image of a graphene sheet in which nanoholes are formed by using a method for forming graphene nanoholes according to an embodiment of the present disclosure, and describes an increase in size of the nanoholes according to pressure an activation gas and processing.

FIG. 4(a) shows a graphene sheet without any treatment, FIG. 4(b) shows a graphene sheet processed in an $XeF_2$ atmosphere at about 1.8 torr, about 25° C. for about 60 seconds to form a functional group-bonded region, and then the region was removed to form nanoholes, FIG. 4(c) shows a graphene sheet processed in an $XeF_2$ atmosphere at about 1.8 torr, about 25° C. for about 180 seconds to form a functional group-bonded region, and then the region was removed to form nanoholes, and FIG. 4(d) shows a graphene sheet processed in an $XeF_2$ atmosphere at about 1.8 torr, about 25° C. for about 300 seconds to form a functional group-bonded region, and then the region was removed to form nanoholes.

As shown in FIG. 4(b), when the method for forming the graphene nanoholes according to an embodiment of the present disclosure is used, nanoholes having a diameter (or length of a major axis) of 1 nm or less is possibly produced.

In addition, as shown in FIG. 4(c) or FIG. 4(d), the size, shape, or density of nanoholes may be controlled by regulating the pressure, temperature, or reaction time in the process of forming the functional group-bonded region.

As such, the method for forming the graphene nanoholes according to an embodiment of the present disclosure is beneficial in that the size and shape of the nanoholes formed according to characteristics of water, ions or gases to be permeated, in filters, separators, or negative electrode materials may be controlled.

In addition, the method for forming the graphene nanoholes according to an embodiment of the present disclosure is also beneficial in that the method is possibly performed in a dry process, and may be readily applied to large-area graphene.

In a method of forming graphene nanoholes according to an embodiment of the present disclosure, the nanoholes may be formed in a graphene sheet in a dry manner by using detachable functional groups.

In addition, the present disclosure provides benefits in that the shape and size of nanoholes to be formed may be controlled by regulating the type of an activating gas, pressure, and time in the process of bonding functional groups in a graphene sheet.

When using the method for forming graphene nanoholes according to an embodiment of the present disclosure, the shape and size of nanoholes formed in the graphene sheet are possibly controlled according to characteristics or size of ions or gases that will permeate the graphene sheet.

When using the method for forming graphene nanoholes according to an embodiment of the present disclosure, the graphene sheet in which nanoholes are formed is possibly used as a filter (e.g., for water purification or for bio), a negative electrode material or a separator of a battery, a fuel cell electrolyte membrane, and a next-generation semiconductor.

It should be noted that effects not mentioned explicitly herein but described in the following description expected by the technical characteristic of the present disclosure and potential effects thereof are considered as being described in the present disclosure.

The protection scope of the present disclosure is not limited to the descriptions and expressions of the embodiments explicitly mentioned above. Also, it should be noted that implementations of the disclosed technology may cover a change or replacement obvious in the related arts. the scope of protection of the present disclosure is not limited due to a change or replacement obvious in the art to which the present disclosure pertains.

What is claimed is:

1. A method for forming graphene nanoholes in a graphene sheet, the method comprising:
   a process (a) of forming a functional group-bonded region in a graphene sheet; and
   a process (b) of heating the graphene sheet having the functional group-bonded region to remove the functional group-bonded region to form nanoholes,
   wherein the process (a) is performed by making an activation gas containing fluorine (F) react with a graphene sheet to form a functional group-bonded region, and
   wherein the process (a) is performed in the presence of a semiconducting catalyst or a metallic catalyst.

2. The method of claim 1, wherein the semiconducting catalyst is a piece of Si wafer.

3. The method of claim 1, wherein the activation gas containing fluorine (F) is any one selected from the group consisting of $XeF_2$, $CF_4$, and $SF_6$, or a combination thereof.

4. The method of claim 1, wherein the process (a) is performed at about 0.2 torr to about 3 torr.

5. The method of claim 1, wherein the size, shape, or density of nanoholes formed at the pressure or reaction time at which the process (a) is performed is controlled.

6. The method of claim 1, wherein the process (a) is performed by forming a functional group-bonded region using hydrogen or oxygen plasma.

7. The method of claim 1, wherein the process (b) is performed at about 50° C. to about 500° ° C. for about 1 hour to about 24 hours in an atmosphere of an inert gas or in a vacuum atmosphere.

* * * * *